United States Patent
Wedi

(10) Patent No.: US 10,710,335 B2
(45) Date of Patent: Jul. 14, 2020

(54) PLATE-TYPE COMPONENT WITH AN OUTER MEMBRANE

(71) Applicant: WEDI GMBH, Emsdetten (DE)

(72) Inventor: Stephan Wedi, Emsdetten (DE)

(73) Assignee: wedi GmbH, Emsdetten (DE)

( * ) Notice: Subject to any disclaimer, the term of this patent is extended or adjusted under 35 U.S.C. 154(b) by 199 days.

(21) Appl. No.: 15/576,985

(22) PCT Filed: May 3, 2016

(86) PCT No.: PCT/EP2016/000723
§ 371 (c)(1),
(2) Date: Nov. 27, 2017

(87) PCT Pub. No.: WO2016/188607
PCT Pub. Date: Dec. 1, 2016

(65) Prior Publication Data
US 2018/0154610 A1   Jun. 7, 2018

(30) Foreign Application Priority Data
May 27, 2015   (DE) .......................... 10 2015 108 357

(51) Int. Cl.
*B32B 13/02*   (2006.01)
*B32B 5/02*   (2006.01)
(Continued)

(52) U.S. Cl.
CPC ............... *B32B 13/02* (2013.01); *B32B 5/02* (2013.01); *B32B 5/18* (2013.01); *B32B 5/245* (2013.01);
(Continued)

(58) Field of Classification Search
CPC .. B32B 13/02; B32B 5/02; B32B 5/18; B32B 5/245; B32B 5/28; B32B 13/045;
(Continued)

(56) References Cited

U.S. PATENT DOCUMENTS

2005/0214507 A1\* 9/2005 McDonald ............ B28B 11/245
428/138
2012/0043745 A1\* 2/2012 Bae ..................... B60R 21/2346
280/742

FOREIGN PATENT DOCUMENTS

DE           29705272 U1    12/1997
DE     102006052561 A1     4/2008
(Continued)

OTHER PUBLICATIONS

WIPO, International Search Report (on parent application), dated Jul. 8, 2016.
Deutsches Patent—Und Markenamt (German Patent and Trademark Office), von 4 Monaten (search in connection with a related application), dated Nov. 5, 2016.

*Primary Examiner* — Vishal I Patel
(74) *Attorney, Agent, or Firm* — Laurence P. Colton; Smith Tempel Blaha LLC

(57) ABSTRACT

A sheet component in layered construction, having a supporting body bounded by two flat sides and at least one cover ply bonded by a mineral type of adhesive layer to the supporting body on the latter's flat side. The cover ply has an air transmission rate between 6.0 and 21 l/dm2/min in the uninstalled state, while the adhesive layer bonded to the cover ply forms a watertight composite. The composite forms a barrier to the still uncured particles of adhesive and ensures that the air is capable of escaping through the structure of the cover ply not only during the step of laying on the cover ply but also in the early curing process of the adhesive layer.

15 Claims, 6 Drawing Sheets

(51) Int. Cl.
    *B32B 5/18*       (2006.01)
    *B32B 5/24*       (2006.01)
    *B32B 5/28*       (2006.01)
    *B32B 13/04*     (2006.01)
    *A47K 3/40*      (2006.01)

(52) U.S. Cl.
    CPC .............. *B32B 5/28* (2013.01); *B32B 13/045* (2013.01); *A47K 3/40* (2013.01); *B32B 2307/724* (2013.01); *B32B 2307/7265* (2013.01); *B32B 2419/00* (2013.01)

(58) Field of Classification Search
    CPC ...... B32B 2307/724; B32B 2307/7265; B32B 2419/00; A47K 3/40
    See application file for complete search history.

(56) References Cited

FOREIGN PATENT DOCUMENTS

| | | | |
|---|---|---|---|
| DE | 102009011323 A1 * | 9/2010 | .............. B32B 5/18 |
| DE | 102009011323 A1 | 9/2010 | |
| DE | 202010013540 U1 | 12/2010 | |
| DE | 202011005194 U1 | 8/2011 | |
| DE | 102012101075 A1 | 8/2013 | |
| DE | 102013104749 A1 | 4/2014 | |
| DE | 202014001573 U1 | 5/2015 | |
| DE | 102013113864 A1 | 6/2015 | |
| EP | 1072397 A2 | 1/2001 | |
| EP | 1712169 A1 | 10/2006 | |

* cited by examiner

PLATE-TYPE COMPONENT WITH AN OUTER MEMBRANE

STATEMENT OF RELATED APPLICATIONS

This application is the US National Phase of International Application No. PCT/EP2016/000723 having an International Filing Date of 3 May 2016, which claims priority on German Patent Application No. 10 2015 108 357.4 having a filing date of 27 May 2015.

BACKGROUND OF THE INVENTION

Technical Field

The invention relates to a sheet component in layered construction with the steps of formatting and providing a supporting body and a prefabricated cover ply; applying a polymer mortar (PCC adhesive) and uniformly distributing same to form an adhesive layer; laying the prefabricated cover ply onto the still viscid adhesive layer; and curing the adhesive present in the component, characterized in that the prefabricated cover ply has an air transmission rate between 6.0 and 21 l/dm$^2$/min and after laying the cover ply onto the still viscid adhesive layer a pressurized membrane of a membrane press applies a molding pressure to the component and in that gases, such as air particles, evolving during the curing process of the adhesive layer are capable of passing outside through the pores or meshes of the composite, wherein the composite forms a barrier to still uncured particles of adhesive and ultimately a whole-areal bond of the cover ply to the adhesive layer is formed without bubbling underneath the cover ply with the outcome that the cover ply in its cured/composited state, and also the overall structure of the sheet component is water and gas impervious.

Prior Art

A sheet component is described in DE 101 31 338 A1. A cover ply is provided in the form of an acrylic resin sealant uniformly applied in the manner of a foil whereonto, and via tile adhesive, a ceramic, for example, material is layable in an areal manner. Between the cover ply and the supporting body of rigid foam there is a mortar layer which may be reinforced with a woven fabric. The disadvantage with this is that laying on the cover ply may lead to irreparable bubbling especially in the case of mortar still not fully cured.

DE 10 2009 011 323 A1 discloses a building sheet comprising a foam mat saturated with mineral adhesive, cement-bound mortar or a filled dispersion and dried. However, even after this treatment, the foam mat remains essentially open-cell and thus is particularly useful for acoustic absorption and does not form a watertight composite in its final state.

DE 10 2013 113 864 A1 discloses an insulating element for use in a composite thermal insulation system. The insulating element comprises a diffusion tight layer of insulation and thus is unsuitable for the transmission of gases.

DE 20 2014 001 573 U1 discloses a building sheet having a vapor-checking and/or -blocking property. The building sheet as a whole has a multi-ply construction. A midply layer consists either of a vapor-blocking aluminum foil or of a vapor-checking polymeric material.

DE 10 2012 101 075 A1 discloses a semi-finished sheeting product, namely a stucco effect wallpaper, and a method of forming it. The stucco effect wallpaper comprises a fibrous nonwoven web which is saturated through with a coating composition and cures to form said stucco effect wallpaper. This stucco effect wallpaper does not have a defined air transmission rate. Hence there is also no way to ensure that gases released during the curing process diffuse outwardly through the fibrous nonwoven web and that the coating composition itself is retained within the fibrous nonwoven web.

EP 1712169 B1 discloses a shower floor element comprising a water-impervious foil for floor and wall sealing. An adhesive layer adheres the foil uniformly to the upper surface of a supporting element of rigid foam.

The disadvantage with this embodiment is that an adhesive based on a mineral type of mortar is unsuitable for adhering the foil. The background to this is that mineral adhesives always have an air content which was incorporated through the mixing process and has to be removed or escape from the adhesive layer during the cure. Where the adherends are air impervious, the air in the mortar adhesive will form bubbles incapable of escaping through the foil or through the sheet of rigid foam.

The bubbles will in part ascend against the force of gravity, to collect directly underneath the foil. A further portion of the bubbles are stopped by the low buoyancy within the mortar adhesive from ascending all the way to the surface, if at all, and become entrapped by the curing adhesive where they are.

The formation of air bubbles is thus solely preventable in the EP 1712169 B1 system by employing an adhesive without entrained air, for example a hotmelt adhesive. Yet this gives rise to a further problem in that as with applying a protective foil to a cellphone display, there is an in-principle difficulty with applying an uninterrupted protective foil to a support without air entrapments. Even with the use of an adhesive without entrained air, therefore, air bubbles may become entrapped underneath the foil.

The air bubbles remaining in the cured component greatly reduce the adherent bonding area between the cover ply and the supporting sheet. Voids are the consequence, potentially increasing in size on continued use through notched stresses arising out of settling and/or extensional stress influences. Corresponding flaws are also flaws in an otherwise uninterrupted film and moreover threaten the possibly assumed waterproofness of the coating plane.

BRIEF SUMMARY OF THE INVENTION

It is an object of the present invention to devise a sheet component and a method of forming it that is capable of ensuring a whole areal adhesive bond of the cover ply to the inferior layer without bubbling.

This object is achieved by a method of forming a sheet component with the steps of formatting and providing a supporting body and a prefabricated cover ply; applying a polymer mortar (PCC adhesive) and uniformly distributing same to form an adhesive layer; laying the prefabricated cover ply onto the still viscid adhesive layer; and curing the adhesive present in the component, characterized in that the prefabricated cover ply has an air transmission rate between 6.0 and 21 l/dm$^2$/min and after laying the cover ply onto the still viscid adhesive layer a pressurized membrane of a membrane press applies a molding pressure to the component and in that gases, such as air particles, evolving during the curing process of the adhesive layer are capable of passing outside through the pores or meshes of the composite, wherein the composite forms a barrier to still uncured particles of adhesive and ultimately a whole-areal bond of the cover ply to the adhesive layer is formed without bubbling underneath the cover ply with the outcome that the cover ply in its cured/composited state, and also the overall structure of the sheet component is water and gas impervious. The cover ply has an air transmission rate between 6.0 and 21 l/dm$^2$/min in the uninstalled state, while the composite combining the cover ply and the adhesive layer forms a watertight composite.

The object is also achieved by a sheet component obtained with the claimed method and by the method of using a cover ply in the manufacture of a component, said cover ply having an air transmission rate between 6.0 and 21 l/dm$^2$/min in the uninstalled state.

Tests in accordance with DIN EN ISO 9237 (Determination of the Permeability of Textile Fabrics to Air) have revealed that the preferred air transmission rate value of the cover ply is between 10.0 and 14.0 l/dm$^2$/min, more preferably between 12.5 and 13.5l/dm$^2$/min.

Cover ply is to be understood as meaning a porous or/and meshlike outer membrane/layer which, for example, is a close net of metal, a perforated metallic or polymeric foil or a textile offcut. The cover ply preferably takes the form of a prefabricated, sheet-like composite combining a mineral or nonmineral adhesive based on mortar or polymer with a textile offcut embedded therein. The textile offcut may consist of at least one textile ply of woven, knit, non-crimp, bonded nonwoven web fabric or a combination thereof.

Where the cover ply comprises an element having indeterminate porous structures, for example a fibrous nonwoven web, it is an essential integer of the invention that these indeterminate porous structures should have the defined air transmission rate referred to. Where the defined air transmission rate is attained as a result of the cover ply having some defined perforation, the individual pores preferably have a diameter between 25 μm and 500 μm, most preferably between 50 μm and 250 μm.

The adhesive comprises for example a polymer cement concrete (PCC mortar). A PCC mortar is a polymer-modified cement-bound mortar as deployed for example in renovation work. What is important in this context is that the textile offcut or the said composite should have an abovementioned air transmission rate value, which ensures that gases, such as air particles, evolving during the curing process of the adhesive layer are capable of passing outside through the pores or meshes of the composite, wherein the composite forms a barrier to still uncured particles of adhesive and ultimately a whole-areal bond of the cover ply to the adhesive layer is formed without bubbling underneath the cover ply with the outcome that the cover ply in its cured/composited state, and also the overall structure of the sheet component is water and gas impervious.

The cover ply has the following advantageous properties:
It ensures that the air is capable of escaping through the structure of the cover ply not only during the step of laying on the cover ply but also in the early curing process of the adhesive layer.
On the other hand, the cover ply is so close that in the step of adhering the cover ply onto the supporting body, no adhesive can penetrate through the cover ply and thereby contaminate the free surface thereof.

A method of fabricating the sheet component proceeds as follows:
formatting and providing a supporting body and a prefabricated cover ply;
applying an adhesive, which preferably comprises a PCC adhesive, and uniformly distributing same to form an adhesive layer;
laying the prefabricated cover ply onto the still viscid adhesive layer;
pressing the cover ply into place under pressure;
supplying heat, if necessary, for forced curing.

The adhesive layer may be applied to the cover ply before the step of contacting with the supporting body.

A membrane press as known per se is deployable for the step of pressing the cover ply into place under pressure. In a membrane press, a pressurized membrane applies a molding pressure to the component as propped up for example on a molding table. It is particularly preferable for the membrane to develop an under-pressure interior for the component. This is accomplished by the membrane first enveloping the component in baglike fashion and then the air in the interior is aspirated away. The atmospheric pressure then presses the membrane against the surface of the cover ply. The advantage with this is that the under-pressure generated in the interior also augments the deaeration of the mortar adhesive by aspirating the air bubbles forming in the adhesive layer in the course of the curing process away through the air-pervious cover ply.

The sheet components of the present invention are variously deployable in building construction. More particularly, they find use in the sanitary sector, for example as tileable shower floor sheets, but also as lining elements and semi-finished product for fabricating bathroom fittings.

BRIEF DESCRIPTION OF THE DRAWINGS

Further features and advantages of the invention will be apparent from the exemplary embodiments which follow.

The exemplary embodiments are more particularly described with reference to the drawing, where.

Like or similar elements may be provided like or similar reference signs in the figures which follow. The figures of the drawing, their description and also the claims further contain numerous features in combination. A person skilled in the art will be aware in this context that these features may also be considered individually or may be brought together to form further combinations not more particularly described here.

DETAILED DESCRIPTION OF PREFERRED EMBODIMENTS

Figure 1A:
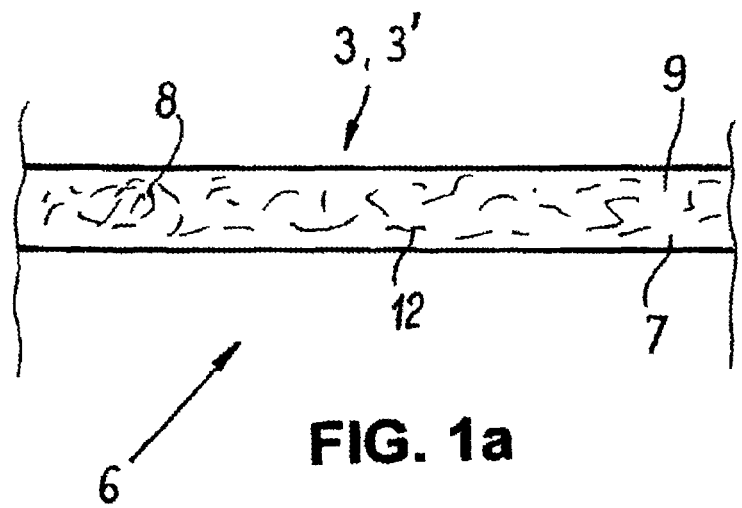
FIG. 1a shows a cover ply in the form of a composite consisting of a fibrous nonwoven web ply embedded in a mortar layer, in a schematic section through the cover ply.

FIG. 1a initially shows in schematic form a cover ply 3, 3' which constitutes a composite 6 comprising a textile offcut 8 embedded in a mineral adhesive 7. The textile offcut 8 is a bonded fibrous nonwoven web fabric 12 ("nonwoven") drawn exaggeratedly thick and comprising polymer fibers present in random disposition, i.e., relatively equally dispersed in all directions of the bonded fibrous nonwoven web fabric.

Figure 1B:
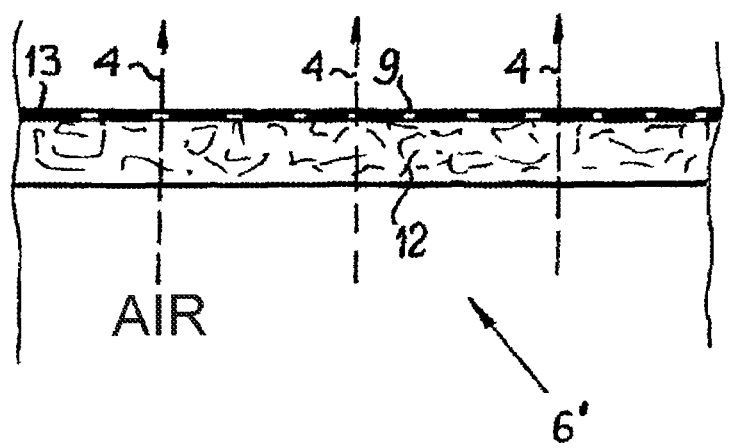
FIG. 1b shows the composite as depicted in FIG. 1a except with an additional woven fabric ply.

FIG. 1b shows in turn a combination of the nonwoven 12 with a non-crimp fabric (NCF) 13 which combine with the adhesive 7 to form a further composite 6'. The two composites 6, 6' have numerous pores/meshes 9 wherethrough the arrowed (reference number 4) gas, such as air, can pass. A nonmineral polymeric mortar has been chosen as adhesive 7. The nonwoven-NCF combination itself (optionally embedded in the polymer mortar) is air pervious and water pervious in its original state.

The air transmission rate value of the cover ply shown in FIG. 1b (in its uninstalled state) is ideally in the range between 12.5 and 13.5 l/dm$^2$/min.

The overall thickness of the cover ply 3, 3' according to FIG. 1b is about 1.5 to 3 mm.

Figure 2A:
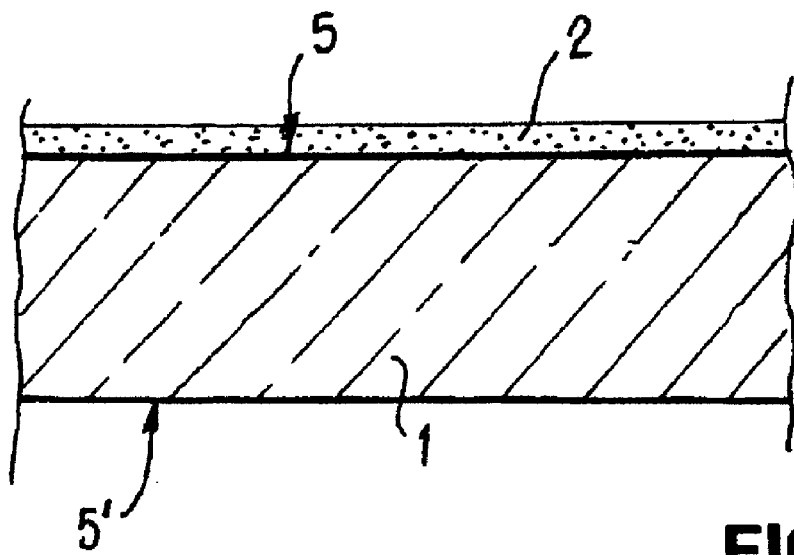
FIG. 2a shows a supporting body of rigid foam with a one-sidedly applied layer of mortar, in a schematic section.

FIG. 2a shows a supporting body 1 bounded by two flat sides 5, 5' in an essentially plane parallel arrangement. The supporting body 1 consists of extruded rigid closed-cell polystyrene foam (XPS). The water vapor diffusion resistance number of the rigid polystyrene foam (XPS) used is about 150 p.

The flat side 5 of the supporting body 1 is coated with an adhesive layer 2, in the present case comprising polymer-modified cement-bound mortar (PCC) capable of achieving the requisite hardness in the surface. The flat side 5 of the supporting body 1 may be slightly trough-shaped or inclined relative to the other, level flat side 5'.

Figure 2B:
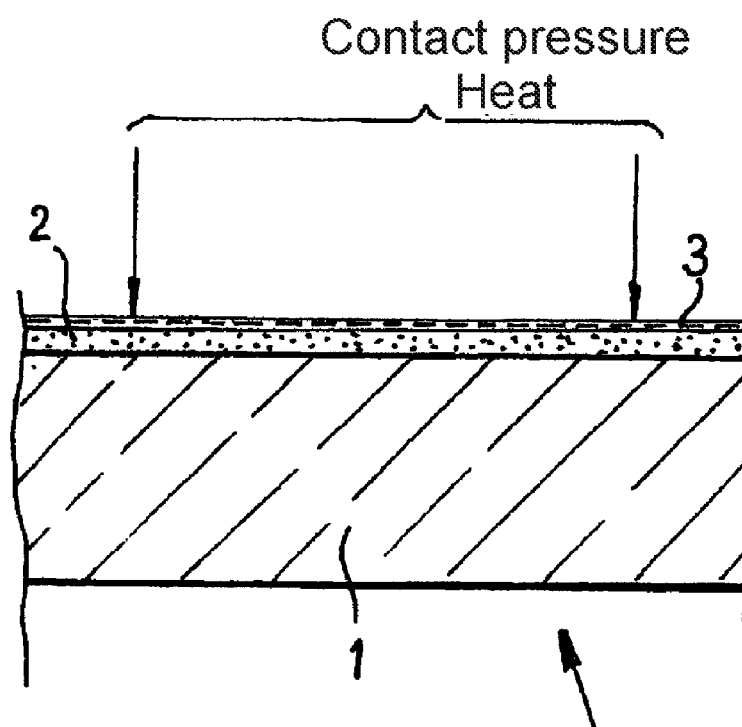
FIG. 2b shows a sheet component comprising the supporting body of FIG. 2a with adhered cover ply, in a schematic section.

According to FIG. 2b, the still liquid adhesive layer 2 (mortar layer) has imported into it a cover ply 3 under contact pressure and thermal agency to overcover said layer, so the mortar layer 2 cures to form a sheet component 100 wherein the supporting body 1 is composited with the prefabricated nonwoven-NCF combination. The second flat side therein, i.e., the flat side remote from flat side 5, i.e., flat side 5' is untreated, displaying no adhesive layer and no cover ply.

Figure 5:
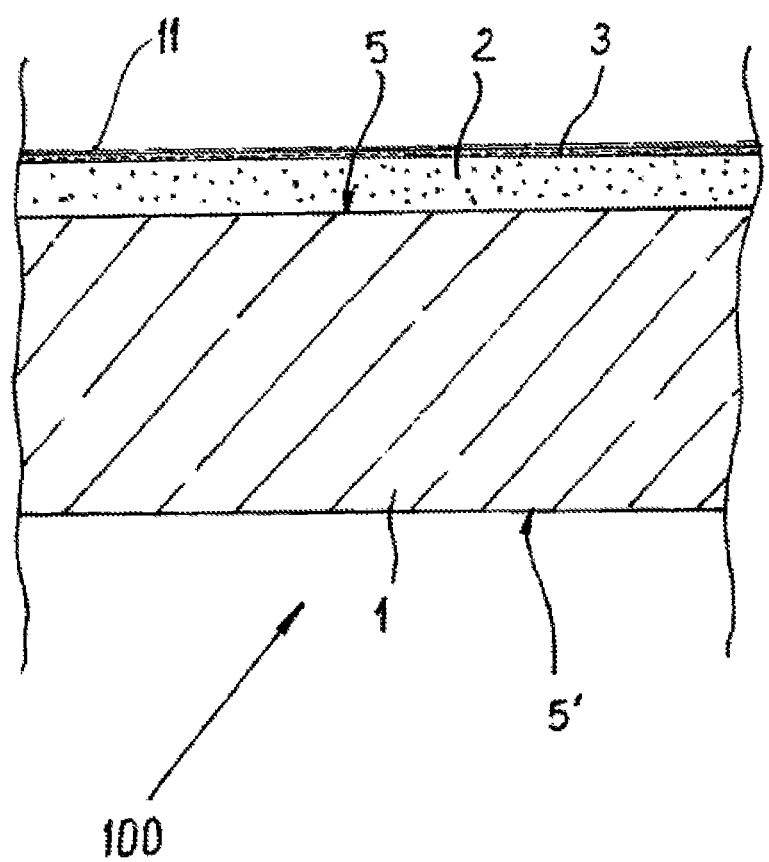
FIG. 5 shows a component as per FIG. 2b with indicated additional protective layer, in a schematic section.

A similar component 100 is depicted in FIG. 5 except that the cover ply 3 is coated with a protective layer 11, preferably a clear lacquer. The coating with the clear lacquer protects the surface of the cover ply 3 from external influences. The protective layer 11 may also be peelable, for example by overcoating it with a release adhesive.

Figure 3A:
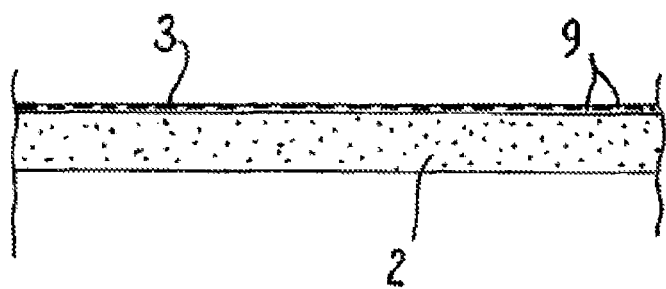
FIG. 3a shows the cover ply laid onto an uncured mineral type layer of mortar.
Figure 3B:
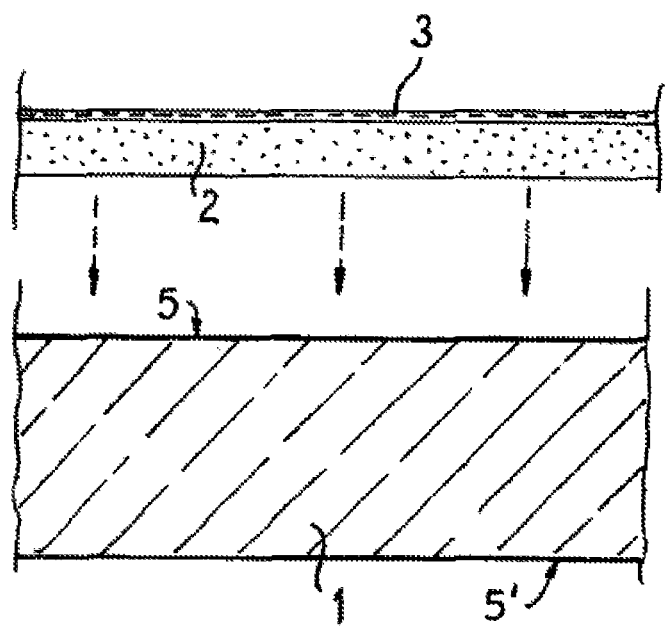
FIG. 3b shows the cover ply of FIG. 3a immediately before bonding to the supporting body.
Figure 3C:
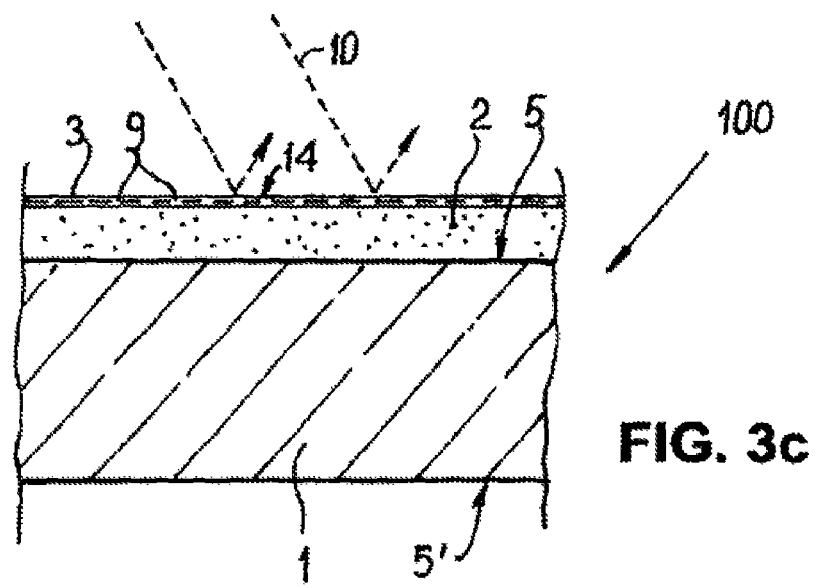
FIG. 3c shows a component with the cover ply of FIG. 3a after the step of curing the mortar layer, in a schematic section.

According to FIG. 3a, the cover ply 3 is initially applied to the mineral uncured adhesive layer 2 to form a cover ply/adhesive combination which according to FIG. 3b is laid onto the flat side 5 of the supporting body 1. Curing results in the air- and watertight component 100 shown in FIGS. 2b and 3c. Reference number 10 identifies molecules of water and/or moisture which against a free surface 14 of the cover ply 3 in the form of a water jet for example bounce and do not penetrate through the cover ply 3.

Figure 4:
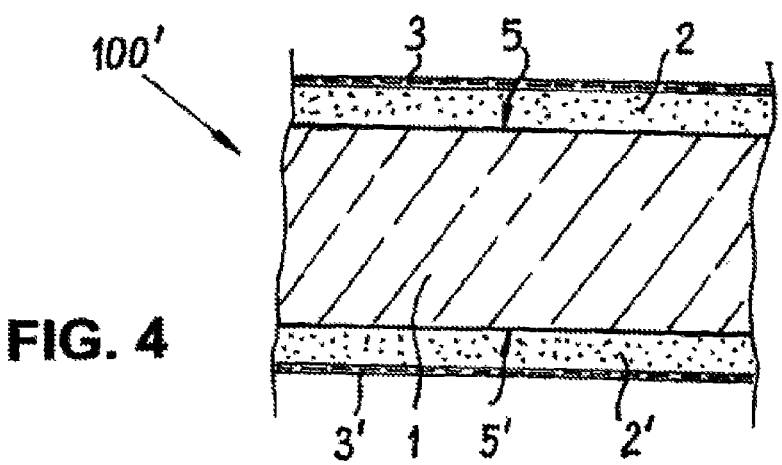
FIG. 4 shows a component comprising a supporting body both-sidedly covered with mortar layers and cover plies, in a schematic section.

An advantageous further development of the subject matter of the invention proposes forming a sheet component 100' as per FIG. 4 wherein both the flat sides 5, 5' of the supporting body 1 are overcovered with the adhesive layer 2, 2' and the cover ply 3. After curing, the entire structure of the both-sidedly coated supporting body 1 is water- and airtight.

Figure 6:
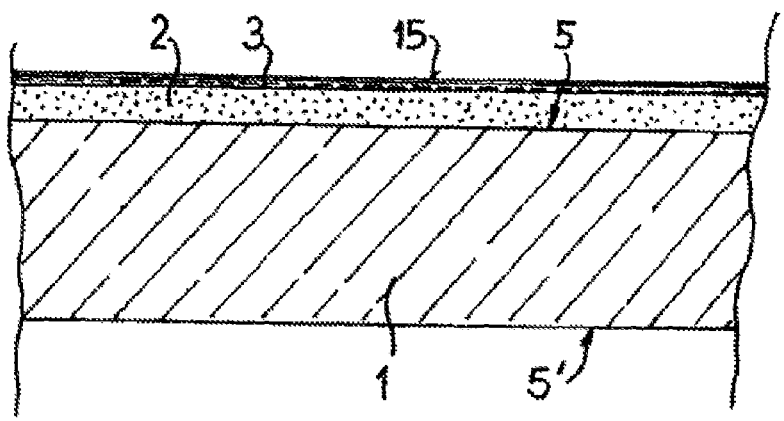
FIG. 6 shows a component as per FIG. 2b additionally coated with a paint layer, in a schematic section.

According to FIG. 6, the cover ply 3 is overcoated with a further coating 15, namely with a paint layer. The paint layer chosen is a low-solvent acrylic lacquer based on a polymer dispersion and capable of providing a waterproof film. The hue may be matched to a manufacturer/company-specific coloration (blue for example) through appropriate pigmentation.

Figure 7:
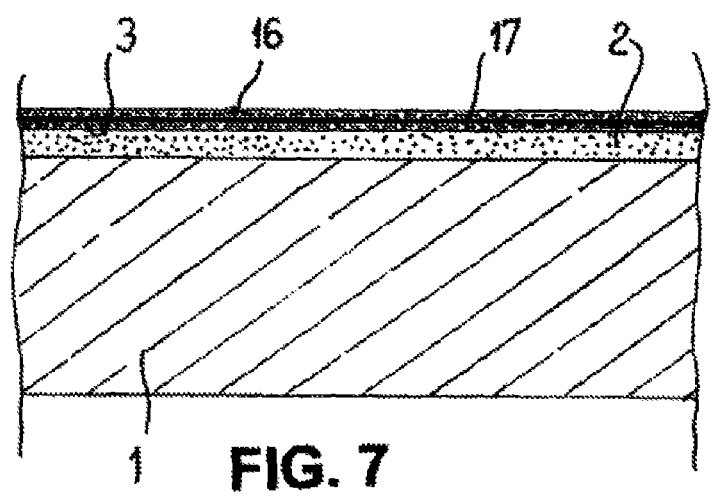
FIG. 7 shows a further component according to FIG. 2b, with two superposed cover plies, again in a schematic section.

FIG. 7 shows two superposed prefabricated cover plies 3 and 16 bonded together via a polymeric adherent layer 17. The cover plies 3 and 16 may be identical or different in terms of material. For instance, the cover ply 3 facing the adhesive layer 2 may comprise a nonwoven/NCF combination while the outer cover ply 16 may comprise a nonwoven/woven fabric combination.

The sheet components according to FIGS. 6 and 7 constitute a development of the component 100 described in FIG. 2b.

The following remarks apply to all the components 100, 100' described above:

- The supporting body 1 may be fabricated from other mineral or nonmineral materials of construction, for example from rigid EPS foam, rigid polyurethane foam, wood fibers, mineral wool, etc. or mixed materials.
- The supporting body 1, when considered in plan view looking down on its flat side 5, 5', may be polygonal, especially rectangular and/or at least partly oval or rounded off.
- The mineral or nonmineral adhesive may be referred to as mortar.
- A reinforcement as known per se may be installed into the adhesive layer 2, 2'.

LIST OF REFERENCE SIGNS 1 supporting body
2, 2' adhesive layer
3, 3' cover ply
4 gas (air)
5, 5' flat side
6, 6' composite
7 adhesive
8 textile offcut
9 pores or meshes
10 molecules of moisture
11 protective layer (clear lacquer)
12 nonwoven
13 woven/non-crimp fabric
14 surface
15 additional coating
16 further cover ply
17 adherent layer
100, 100' component

What is claimed is:
1. A method of forming a sheet component (100; 100'), the method comprising the steps of:
   formatting and providing a supporting body (1) and a prefabricated cover ply (3, 3');

applying a polymer mortar (PCC adhesive) and uniformly distributing the polymer mortar to form an adhesive layer (2, 2');

laying the prefabricated cover ply (3, 3') onto the still viscid adhesive layer (2, 2'); and curing the adhesive present in the sheet component (100; 100') such that a composite, of the cover ply (3, 3') layer and the adhesive (2, 2') layer, is produced;

wherein the prefabricated cover ply (3, 3') has an air transmission rate of between 6.0 $l/dm^2/min$ and 21.0 $l/dm^2/min$;

wherein, after laying the cover ply (3, 3') onto the still viscid adhesive layer (2, 2'), a pressurized membrane of a membrane press applies a molding pressure to the sheet component (100; 100') such that gases, that evolve during the curing of the adhesive layer (2, 2'), are capable of passing through pores or mesh of the produced composite;

wherein the produced composite forms a barrier about any uncured particles of adhesive that remain in the sheet component (100; 100'); and wherein a whole-areal bond of the cover ply (3, 3') layer to the adhesive (2, 2') layer is formed, without bubbling underneath the cover ply (3, 3'), such that the cover ply (3, 3') layer in the sheet component (100; 100'), whether in the cured composite state, with the adhesive (2, 2') layer, or in the uncured state, is water and gas impervious.

2. The method of forming a sheet component (100; 100') as claimed in claim 1, wherein the air transmission rate of the cover ply (3, 3') is between 10.0 $l/dm^2/min$ and 14.0 $l/dm^2/min$.

3. The method of forming a sheet component (100; 100') as claimed in claim 1, wherein the cover ply (3, 3') is first laid onto the uncured adhesive layer (2, 2') which in turn is bondable to the supporting body (1).

4. The method of forming a sheet component (100; 100') as claimed in claim 1, wherein the composite of the cover ply (3, 3') with the adhesive layer (2, 2'), and the curing period of the adhesive material of the adhesive layer (2, 2'), are in a controlled manner by the application of contact pressure and/or heat.

5. The method of forming a sheet component (100; 100') as claimed in claim 1, wherein the cover ply (3, 3') is bonded to the adhesive layer (2, 2') by application of elevated temperature.

6. The method of forming a sheet component (100; 100') as claimed in claim 1, wherein the cover ply (3, 3') has applied thereon at least one polymeric protective layer (11).

7. The method of forming a sheet component (100; 100') as claimed in claim 1, wherein the cover ply (3, 3') is overcoated with at least one further coating (15) comprising mineral matter or paint layer.

8. The method of forming a sheet component (100; 100') as claimed claim 1, wherein the cover ply (3, 3') is covered up with a further prefabricated cover ply (16).

9. The method of forming a sheet component (100; 100') as claimed in claim 1, wherein a membrane of the membrane press develops an underpressure interior for the sheet component (100; 100') by initially enveloping the sheet component (100; 100') in baglike fashion and then aspirating away air from the interior such that the membrane is pressed against the surface of the cover ply (3, 3'), and such that the underpressure generated in the interior augments the deaeration of the adhesive.

10. The method of forming a sheet component (100; 100') as claimed in claim 9, wherein a membrane of the membrane press develops an underpressure interior for the sheet component (100; 100') by initially enveloping the sheet component (100; 100') in baglike fashion and then aspirating away air from the interior such that the membrane is pressed against the surface of the cover ply (3, 3'), and such that the underpressure generated in the interior augments the deaeration of the adhesive.

11. The method of forming a sheet component (100; 100') as claimed in claim 9, wherein the air transmission rate of the cover ply (3, 3') is between 10.0 $l/dm^2/min$ and 14.0 $l/dm^2/min$.

12. The method of forming a sheet component (100; 100') as claimed in claim 9, wherein the cover ply (3, 3') is first laid onto the uncured adhesive layer (2, 2') which in turn is bondable to the supporting body (1).

13. The method of forming a sheet component (100; 100') as claimed in claim 9, wherein the cover ply (3, 3') has applied thereon at least one polymeric protective layer (11).

14. The method of forming a sheet component (100; 100') as claimed in claim 9, wherein the cover ply (3, 3') is overcoated with at least one further coating (15) comprising mineral matter or paint layer.

15. The method of forming a sheet component (100; 100') as claimed in claim 9, wherein the cover ply (3, 3') is covered up with a further prefabricated cover ply (16).

* * * * *